(12) United States Patent
Zimmermann

(10) Patent No.: US 8,129,914 B2
(45) Date of Patent: Mar. 6, 2012

(54) OPERATING CIRCUIT FOR LIGHT-EMITTING DIODES

(75) Inventor: Michael Zimmermann, Heiligenkreuz (CH)

(73) Assignee: Tridonicatco Schweiz AG (CH)

( * ) Notice: Subject to any disclaimer, the term of this patent is extended or adjusted under 35 U.S.C. 154(b) by 510 days.

(21) Appl. No.: 12/297,972

(22) PCT Filed: Apr. 12, 2007

(86) PCT No.: PCT/EP2007/003260
§ 371 (c)(1),
(2), (4) Date: Apr. 15, 2009

(87) PCT Pub. No.: WO2007/121870
PCT Pub. Date: Nov. 1, 2007

(65) Prior Publication Data
US 2009/0273292 A1  Nov. 5, 2009

(30) Foreign Application Priority Data

Apr. 21, 2006  (DE) .......................... 10 2006 018 578
Jul. 25, 2006  (DE) .......................... 10 2006 034 371

(51) Int. Cl.
*H05B 37/02* (2006.01)
(52) U.S. Cl. ............... 315/209 R; 315/224; 315/225; 315/291; 315/307; 315/308
(58) Field of Classification Search .................. 315/315, 315/209 R, 219, 224, 225, 291, 307, 308, 315/312; 323/222, 265, 299
See application file for complete search history.

(56) References Cited

U.S. PATENT DOCUMENTS

| | | | |
|---|---|---|---|
| 6,057,651 A | 5/2000 | Usami | |
| 6,320,330 B1* | 11/2001 | Haavisto et al. | 315/291 |
| 7,408,308 B2* | 8/2008 | Sawada et al. | 315/291 |
| 7,598,682 B2* | 10/2009 | Grajcar | 315/291 |
| 2005/0218838 A1* | 10/2005 | Lys | 315/291 |
| 2006/0145670 A1* | 7/2006 | Zhou et al. | 323/222 |
| 2007/0170874 A1* | 7/2007 | Kunimatsu et al. | 315/291 |
| 2011/0260641 A1* | 10/2011 | Grajcar | 315/291 |

FOREIGN PATENT DOCUMENTS

| | | |
|---|---|---|
| EP | 1033903 | 9/2000 |
| EP | 1278401 | 1/2003 |
| WO | 9602970 | 2/1996 |

OTHER PUBLICATIONS

International Search Report PCT/EP2007/003260; Dated Jul. 16, 2007.

* cited by examiner

*Primary Examiner* — Douglas W Owens
*Assistant Examiner* — Thai Pham
(74) *Attorney, Agent, or Firm* — Cantor Colburn LLP

(57) ABSTRACT

An operating circuit for at least one light-emitting diode (LED) incorporates a switched-mode regulator circuit to which a DC voltage is fed and which provides a supply voltage for the at least one light-emitting diode (LED) by means of a coil (L1) and a switch (S1) clocked by a control unit (SR). When the switch (S1) is on, energy is built up in the coil (L1), which is discharged through the at least one light-emitting diode (LED) when the switch (S1) is off. The control unit (SR) determines the time period between the switch (S1) switching off and subsequently switching on depending on the voltage across the at least one light-emitting diode (LED) and a temporally constant characteristic parameter of the coil (L1).

23 Claims, 3 Drawing Sheets

OPERATING CIRCUIT FOR LIGHT-EMITTING DIODES

TECHNICAL FIELD OF THE INVENTION

The present invention relates to methods and circuitry for operating light-emitting diodes by means of switching regulators to provide the operating voltage for the LEDs.

BRIEF SUMMARY OF RELATED ART

It is basically known to use switching regulators, in particular buck converters, to drive light-emitting diodes. A control unit here drives a clocked semi-conductor power switch, by means of which, in its switched-on state, an inductance is energised, wherein the energy of the inductance then discharges via the light-emitting diode section in the switched-off state of the switch.

The light-emitting diodes therefore give rise to a zigzag-shaped course of the current about a constant mean value, resulting respectively in the switched-on state of the switch in a rising edge and in the switched-off state of the switch in a falling edge of the light-emitting diode current.

The chronological mean value of the light-emitting diode current can thus be set by appropriate clocking of the power switch. To regulate the mean value of the light-emitting diode current, the current through the light-emitting diodes must also accordingly be detected. The problem in this case is that during detecting of the light-emitting diode current by means of a shunt on the lower-potential side of the light-emitting diode route or section a signal which may be at a relatively high potential of, for example, close to 40 volts, has to be tapped and analysed. This alone already prevents the entire control unit including the light-emitting diode detection being fully integrated.

Finally, there is often a demand to make available a common plus connection for LED modules. This makes it impossible to measure at the upper fixed potential, since a common potential would thereby be impracticable in control devices for several colours.

A further problem in this case is that the potential on the lower-potential side of the light-emitting diode section at constant operating voltage naturally depends on the number and type of several light-emitting diodes connected in series, since each light-emitting diode causes a defined voltage drop. Therefore flexible light-emitting diode detection has to be configured for very differing potentials, making current detection even more complex.

BRIEF SUMMARY OF THE INVENTION

The invention now aims at a technique in which driving the switch and, put more accurately, establishing the length of switching-off time from switching off the power switch to subsequently switching it on again can be done without detecting the light-emitting diode current. At the same time it is still important to ensure that the diode current and therefore the diode power is kept constant.

According to a first aspect of the invention, therefore, an operating circuit for at least one light-emitting diode (or several light-emitting diodes connected in series) is provided, which has a switching regulator. The switching regulator is fed with a DC voltage or a rectified alternating voltage. By means of a coil and a switch clocked by a control unit a supply voltage or supply current is provided for the at least one light-emitting diode. This supply current normally has a zig-zag-shaped course around a constant mean value, wherein the chronological mean value represents the effective current through the light-emitting diode section. When the switch is switched on, an energy is built up in the coil, which discharges via the at least one light-emitting diode when the switch is switched off.

According to the invention the control unit determines the period between switching off the switch and subsequently switching it on again depending on the light-emitting diode voltage and a chronologically constant parameter of the coil.

Even if, in addition, the lamp current can also be detected in a known way, the present technology nevertheless makes it possible basically also to cope without detecting the light-emitting diode current.

The light-emitting diode voltage can be determined, for example, using the difference between the operating voltage and the potential of the lower-potential side of the light-emitting diodes in a buck converter or the higher-potential side of the light-emitting diodes in a boost converter.

The coil parameter can basically be determined using the electrical parameters of the coil. Alternatively, the control unit can also detect the chronologically constant coil parameter when the switch is switched on for the first time, via the steepness of the increase in the coil current, possibly taking into account the coil voltage. For example, the period until the coil current, rising from zero during the first switching-on process, reaches a reference value, may be determined for this. This detection has the advantage that any tolerances or manufacturing variations are automatically compensated for, since the actual present electromagnetic behaviour of the coil is in fact being detected.

It may in particular be provided with the present invention that the control unit does not detect the light-emitting diode current.

The control unit may detect the current through the switch via a shunt.

Since, as stated, light-emitting diode current detection, possibly at high potential, is not absolutely necessary, the control unit can be designed as an integrated circuit, such as an ASIC, for example.

The control unit may drive switches in the form of PWM-modulated signals.

The control unit can establish the switching-on period, i.e. the period between switching on the power switch and immediately subsequent switching off by comparing the switch current with a (for example, internal) reference value of the control unit and at the same time switch the switch off again when the current through the switch reaches or exceeds the reference value.

The detected switch current may have an additional value applied, which is greater, the quicker the increase in the switch current is after the switch has been switched on again.

The switching regulator may be a boost converter or a buck converter.

The invention also proposes methods for operating a light-emitting diode by means of a switching regulator.

BRIEF DESCRIPTION OF THE DRAWINGS

Further features, advantages and properties of the present invention will now be explained using the figures of the accompanying drawings and the detailed description of embodiments.

FIG. 1 shows schematically a circuit for regulated operation of light-emitting diodes (LEDs). In the example illustrated two light-emitting diodes are connected in series, while it is specifically an advantage of the present invention that the operating circuit adapts very flexibly to the type and number of likewise serially connected light-emitting diodes (LEDs).

The operating circuit is fed with an input direct current $V_{in}$, which can also of course be a rectified alternating voltage.

A series circuit between a semi-conductor power switch S1 (for example a MOSFET) and a recovery diode D1 energises an inductance L1 in the switched-on state of the switch S1 by means of the current flowing through the switch. In the switched-off state of the switch S1 the energy stored in the coil L1 discharges in the form of a current i through a capacitor C1 and the light-emitting diode section LED.

A control and/or regulating circuit SR is provided, which, as the output variable for the regulation of the light-emitting diode power, specifies the clocking of the switch S1, for example in the form of PWM-modulated signals.

By means of a shunt RS the control and/or regulating circuit SR detects the current through the switch S1 (in the switched-on state of the switch S1).

The control and/or regulating unit SR can detect the potential on the lower-potential side of the LED section via a voltage divider R1, R2.

A further voltage divider R3, R4 enables detection of the supply voltage.

Figure 1:
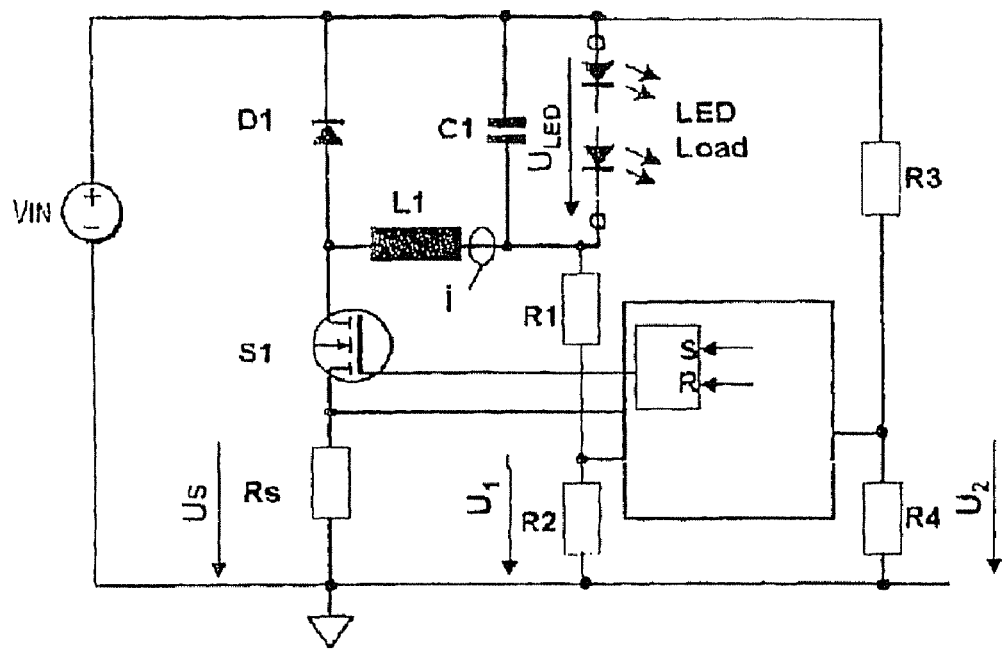
FIG. 1 shows a first embodiment of an operating circuit (buck) according to the invention for light-emitting diodes.

As shown in FIG. 1, with the present invention it is not necessary to detect the current through the light-emitting diodes. On the other hand, by means of the circuit according to the invention it is furthermore possible to keep the mean value of the light-emitting diode current and also as required ($P_{LED}=U_{LED} \times I_{LED}$, both known) the power of the light-emitting diodes constant, from the point of view of a chronological mean value.

Figure 2:
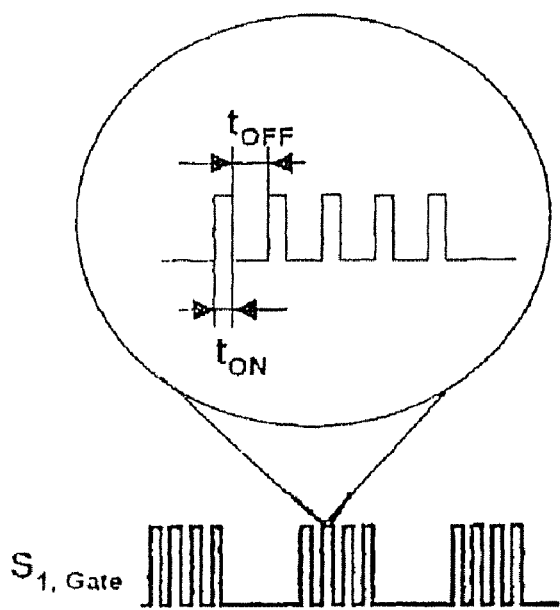
FIG. 2 shows schematically the drive signals for the control connection (gate or base) of the semi-conductor power switch S1.

FIG. 2 shows the drive signals $S_{1Gate}$ issued by the control and/or regulating unit SR to the control connection of the semi-conductor power switch S1 in the form of PWM-modulated signals.

The period between switching on the switch S1 and immediately subsequently switching it off is designated below as $t_{on}$. Correspondingly, the period between switching off the switch and subsequently switching it on again is designated by $T_{off}$. The period during which the switch S1 is switched on for the first time is designated by t1.

The switching-on period $t_{on}$ is according to the invention determined in that after the switch S1 has been switched on the switch current is monitored by the control and/or regulating unit SR using the voltage signal from the shunt RS. The end of the switched-on period $t_{on}$ is established in that the detected switch current reaches or exceeds an internal reference value $U_{ref}$ of the control and/or regulating unit SR.

It is thus easy to monitor the course of the current in the switched-on state of the switch S1.

On the other hand, direct detection of the current through the coil L1 in the switched-off state of the switch S1 is not necessary according to the present invention.

In the prior art, as stated, the light-emitting diode current in the switched-off period of the switch S1 is detected and the switch S1 switched on again when this light-emitting diode current has reached a lower limit value.

In the present invention the switching-off period $t_{off}$ for the switch S1 is now dependent on the voltage $U_{led}$ over the light-emitting diode section and a chronologically non-changing characteristic value $k_L$ for the inductance (throttle) L1.

The light-emitting diode voltage $U_{led}$ can be determined by the control and/or regulating circuit SR using the difference between the operating voltage detected via the voltage divider R3, R4 and the voltage on the lower-potential side of the light-emitting diode section detected by means of the voltage divider R1, R2.

The chronologically non-changing throttle characteristic value $k_L$ can be calculated or measured using the electrical characteristic values of the inductance L1, for example.

Figure 3:
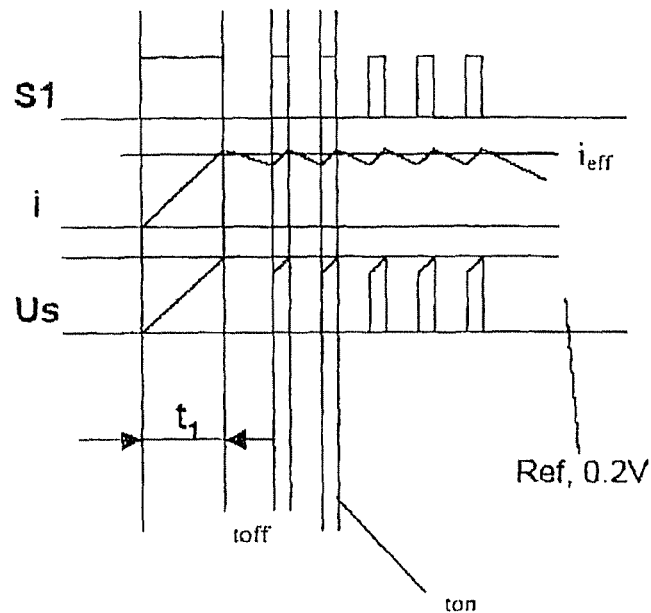
FIG. 3 shows the variation of the signals as they emerge in the circuit according to FIG. 1.

However, it is particularly advantageous if the electromagnetic behaviour of the coil L1 is determined using the increase in the coil current when the switch S1 is switched on for the first time. The characteristic value $k_L$ is thus a function of the period $t_1$ and the coil voltage (measurable during the ON cycle), i.e. of the $t_{on}$ time between switching on for the first time and the time at which the switch current (represented by $U_s$), increasing from zero, reaches the internal reference value of the control and/or regulating circuit SR. This is illustrated schematically in FIG. 3. In FIG. 3 the gate drive signal for the switch S1 is illustrated in the top graphic. On switching on for the first time during the period $t_1$ the current i through the coil L1 and also the current through the switch, represented by the voltage signal $U_s$ from the shunt R1, increases.

When the voltage US, representing the switch current, reaches the reference value $U_{ref}$, the switch S1 is switched off again (switch signal S1 to "low"). In this state the coil current i drops again, since the stored electromagnetic energy in the coil L1 discharges over the light-emitting diode section. After the switching off period $T_{off}$ as defined above has elapsed, the control and/or regulating unit SR will switch on the switch again and this for a switching-on period $T_{on}$ which is again determined using the current through the switch S1. The current course i shown, which on chronological average runs in a zigzag shape around a constant mean value $i_{eff}$, thus arises.

In order to achieve targeted dimming of the light-emitting diodes by way of a PWM modulation, the switching-off period $T_{off}$ can be extended in the sense of genuine pauses in the diode current, care being taken that the switching-off times cannot be detected by the human eye. With pauses of this kind, renewed switching-on naturally leads to magnetisation of the coil, which is meanwhile compensated for by the regulation according to the invention on the throttle current.

A particular problem may arise if the increase in the current through the coil L1 with a corresponding low inductance of the coil L1 runs very fast in respect of the switching-off behaviour too slowly when the switch S1 is driven. In this case there would be reason to fear that, owing to the chronological delay in the switching-off process of the switch S1, the switch current and therefore the shunt voltage "shoots out" undesirably above the reference value $U_{ref}$ and thus damage to the switch could occur. The mean value current at least will no longer correspond to the desired accuracy owing to the over-high current peaks.

As stated, this problem is the more marked, the faster the increase in the coil current i is after the switch S1 has been switched on again.

According to the invention it is therefore provided that the measured switch current value is charged with an additional value, which is greater, the steeper the increase in the course of the current through the coil is, i.e. the shorter the period t1 is.

Figure 4:
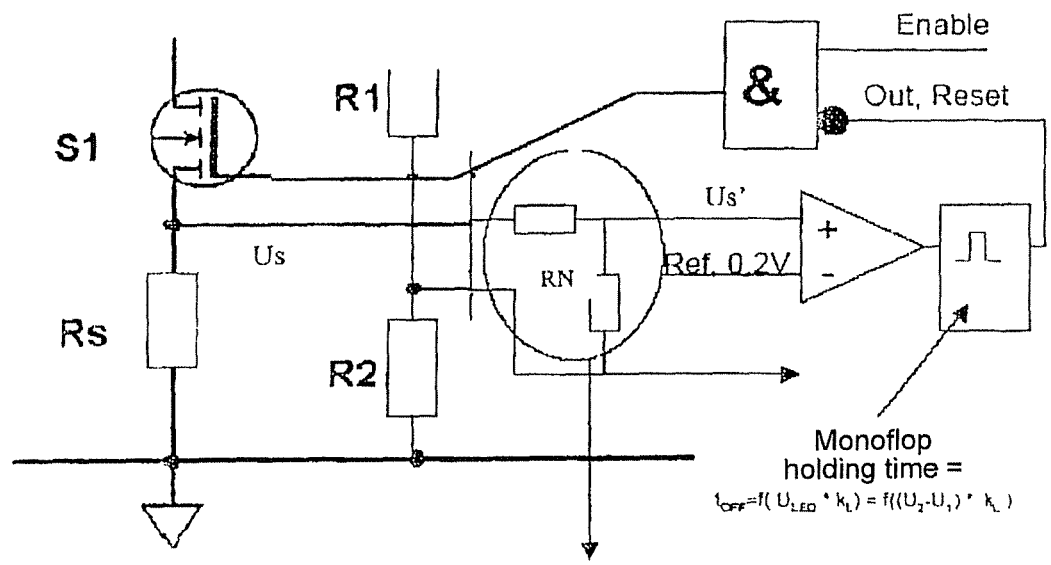
FIG. 4 shows a circuit detail for charging the switch current detection value with an additional value which depends on the speed of the increase in the coil current (or the coil voltage).

FIG. 4 now shows an implementation according to the circuit of charging of this kind. A resistance network $R_N$ is provided here, which charges the measured current value (represented by $U_s$) with an additional value, which is tapped by the connecting point of the voltage divider R1, R2, so that the value of the charging depends on the level of the potential on the lower-potential side of the light-emitting diode section. The higher this potential is on the lower-potential side of the light-emitting diode section in respect of earth, the steeper too of course is the increase in the coil current in the switched-on state of the switch S1.

As illustrated in the figures, the thus modified current measured value $U_s'$ is fed to a capacitor in the regulating and/or control unit SR, wherein this capacitor compares the modified current measured value $U_s$ with an internal reference of, for example, 0.2 V. The output signal of the capacitor in turn drives the switching-off time for the switch S1.

Figure 5:
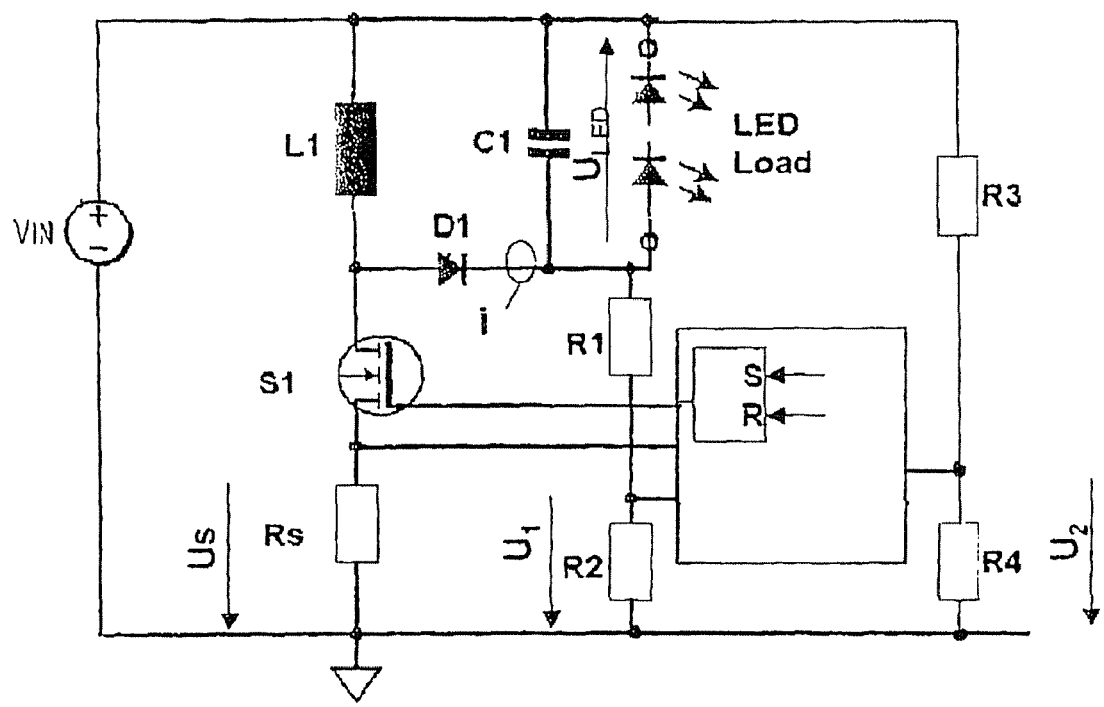
FIG. 5 shows a modification of the circuit in FIG. 1 (boost version).

FIG. 5 shows a modification of the circuit in FIG. 1 to the extent that the arrangement of the throttle L1, the recovery diode D1 and the orientation of the light-emitting diode section is modified (boost topology).

Overall it therefore remains to emphasise that the invention provides a technique in which a chronological mean value of the current through the light-emitting diodes and thus a chronological constancy of the light-emitting diode current or the power (if the diode voltage is involved) can also be carried out without detecting the light-emitting diode current. Since regulation by determining the switching-off period $T_{off}$ depends on the potential on the lower-potential side of the light-emitting diode section, the regulating behaviour is automatically adjusted to a change in the number and/or type of light-emitting diodes used or a chronological/thermal change in the light-emitting diodes.

The invention claimed is:

1. An operating circuit for at least one light-emitting diode, having a switching regulator circuit, to which a direct voltage is fed and by means of a coil and a switch clocked by a control unit, provides a supply voltage for the at least one light-emitting diode,
   wherein when the switch is switched on an energy is built up in the coil, which discharges via the at least one light-emitting diode when the switch is switched off, and
   wherein the control unit determines the period ($t_{off}$) between switching off the switch and subsequently switching it on in dependence on the voltage across the at least one light-emitting diode and a chronologically constant parameter of the coil.

2. A circuit according to claim 1,
   in which the control unit determines the light-emitting diode voltage by means of the difference between an operating voltage and a lower-potential side of the light-emitting diode.

3. A circuit according to claim 1,
   in which the control unit detects a coil parameter via the steepness of increase in a coil current and by involving a coil voltage.

4. A circuit according to claim 1,
   in which the control unit does not detect the current through the at least one light-emitting diode.

5. A circuit according to claim 1,
   in which the control unit detects the current through the switch via a shunt.

6. A circuit according to claim 1,
   in which the control unit is an integrated circuit.

7. A circuit according to claim 1,
   in which the control unit drives the switch in the form of PWM-modulated signals.

8. A circuit according to claim 1,
   in which the control unit establishes the switching-on period of the switch by comparing the current through the switch with a reference value and switches off the switch again when the current through the switch reaches the reference value.

9. A circuit according to claim 8,
   in which the detected switch current is charged with an additional value, which is greater, the steeper the increase in the switch current is after the switch has been switched on again.

10. A circuit according to claim 1,
    in which the switching regulator is a boost converter or a buck converter.

11. An operating circuit for at least one light-emitting diode, having a switching regulator circuit, to which a direct voltage is fed and provides a supply voltage for the at least one light-emitting diode by means of a coil and a switch clocked by a control unit,
    wherein, when the switch is switched on, an energy is built up in the coil, which discharges via the at least one light-emitting diode when the switch is switched off,
    wherein, to determine the switching-on period of the switch, the control unit compares the switch current with a reference value, and
    wherein the detected switch current is charged with an additional value, which is greater, the steeper the increase in the switch current is after the switch has been switched on again.

12. A circuit according to claim 11,
    wherein the circuit is configured to involve the LED voltage for constant power regulation.

13. A method for operating at least one light-emitting diode by means of a switching regulator circuit, to which a direct current is fed and which provides a supply voltage for the at least one light-emitting diode by means of a coil and a switch,
    wherein when the switch is switched on an energy is built up in the coil, which discharges via the at least one light-emitting diode when the switch is switched off, and
    wherein the period between switching off the switch and subsequently switching it on depends on the voltage across the at least one light-emitting diode and a chronologically constant parameter of the coil.

14. A method according to claim 13,
    in which the light-emitting diode voltage is determined by means of the difference between an operating voltage and a lower-potential side of the light-emitting diode.

15. A method according to claim 13,
    in which a coil parameter is detected via the steepness of the increase in a coil current and by involving a coil voltage, preferably when the switch is switched on for the first time.

16. A method according to claim 13,
    in which the current through the at least one light-emitting diode is not detected.

17. A method according to claim 13,
    in which the current through the switch is detected via a shunt.

18. A method according to claim 13,
    in which the switch is driven in the form of PWM-modulated signals.

19. A method according to claim 13,
    in which the switching-on period of the switch is established by comparing the current through the switch with a reference value and the switch is switched off again when the current through the switch reaches the reference value.

20. A method according to claim 19,
in which the detected switch current is charged with an additional value, which is greater, the steeper the increase in the switch current is after the switch has been switched on again.

21. A method according to claim 13,
in which a boost converter or a buck converter is used as switching regulator.

22. A method for operating at least one light-emitting diode by means of a switching regulator circuit, to which a direct voltage is fed and which provides a supply voltage for the at least one light-emitting diode by means of a coil and a switch clocked by a control unit,
wherein when the switch is switched on an energy is built up in the coil, which discharges via the at least one light-emitting diode when the switch is switched off,
wherein, to record the switching-on period of the switch, the control unit compares the switch current with a reference value and
wherein the detected switch current is charged with an additional value, which is greater, the steeper the increase in the switch current is after the switch has been switched on again.

23. A method according to claim 13,
wherein constant power regulation takes place by involving the LED voltage.

* * * * *